(12) United States Patent
Takahashi

(10) Patent No.: US 9,606,599 B2
(45) Date of Patent: Mar. 28, 2017

(54) POWER SUPPLY CIRCUIT

(71) Applicant: CANON KABUSHIKI KAISHA, Tokyo (JP)

(72) Inventor: Katsumi Takahashi, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 14/088,789

(22) Filed: Nov. 25, 2013

(65) Prior Publication Data

US 2014/0157029 A1    Jun. 5, 2014

(30) Foreign Application Priority Data

Nov. 30, 2012 (JP) ................................. 2012-263256
Oct. 29, 2013 (JP) ................................. 2013-224605

(51) Int. Cl.
*G06F 1/26* (2006.01)
*G06F 1/32* (2006.01)
*H04N 1/00* (2006.01)

(52) U.S. Cl.
CPC .............. *G06F 1/263* (2013.01); *G06F 1/32* (2013.01); *G06F 1/3284* (2013.01); *H04N 1/00896* (2013.01); *Y02B 60/1267* (2013.01)

(58) Field of Classification Search
CPC ............... G06F 1/26; G06F 1/263; G06F 1/32
See application file for complete search history.

(56) References Cited

U.S. PATENT DOCUMENTS

| 5,945,816 A * | 8/1999 | Marusik ................... G05F 1/56 307/86 |
| 6,420,906 B1 * | 7/2002 | Kohda ..................... H02J 9/061 326/113 |
| 2002/0135235 A1 * | 9/2002 | Winick .................... H02J 1/102 307/87 |
| 2010/0207550 A1 * | 8/2010 | Kim ..................... G09G 3/2965 315/363 |

FOREIGN PATENT DOCUMENTS

| JP | H05-207732 A | 8/1993 |
| JP | 2000-324820 A | 11/2000 |
| JP | 2002-095247 A | 3/2002 |
| JP | 2009-183020 A | 8/2009 |
| JP | 2010-145653 A | 7/2010 |

* cited by examiner

*Primary Examiner* — Fahmida Rahman
(74) *Attorney, Agent, or Firm* — Canon U.S.A., Inc. IP Division

(57) ABSTRACT

A power supply circuit includes a first power supply for a normal power mode, a second power supply for a power saving mode, which is connected in parallel with the first power supply, a controller to which power from the first power supply and power from the second power supply are supplied via a common connection point, and a switch element which is connected between an output terminal of the first power supply and the connection point and controls power that is supplied to the controller, wherein the switch element includes a diode between a source terminal and a drain terminal of the switch element, the drain terminal of the switch element is connected to the first power supply (Continued)

side to prevent current flowing from the connection point toward the first power supply, and the source terminal of the switch element is connected to the connection point side.

5 Claims, 8 Drawing Sheets

POWER SUPPLY CIRCUIT

BACKGROUND OF THE INVENTION

Field of the Invention

The present invention relates to a power supply circuit that includes a plurality of power supplies having different power supply capabilities.

Description of the Related Art

Recently, there is a demand for an image forming apparatus to consume less energy, so that reduced power consumption is now very important during a power saving mode, and not only during a normal power mode. Japanese Patent Application Laid-Open No. 2010-145653 discusses a power supply circuit that has a configuration like that illustrated in FIG. 5, for example.

In FIG. 5, the power supply circuit includes a power-saving power supply 310 for a power saving mode and a main power supply 320 for a normal power mode, for example. The power-saving power supply 310 for a power saving mode supplies power highly efficiently when the output is a few watts. The main power supply 320 for a normal power mode supplies power highly efficiently when the output is a few hundred watts. A system controller 101 selectively switches these plurality of power supplies based on a state of the image forming apparatus.

Specifically, in the power saving mode, power is supplied from the power-saving power supply 310 to the system controller 101, and in the normal power mode, power is supplied from the main power supply 320 to the system controller 101.

Operation of the circuit illustrated in FIG. 5 will now be described. During the power saving mode, the system controller 101 sets a control signal S1 to a high (Hi) state, and a first switch element 312 is consequently turned on. At this stage, the system controller 101 shuts a relay 301 with a control signal S3, and the main power supply is in an OFF state. The system controller 101 sets a control signal S2 to a low (Low) state and turns off a second switch element 322 as well. In the power saving mode, an output Vcc1 from the power-saving power supply 310 is supplied to the system controller 101 while the other power supply is in an OFF state, so that power consumption is reduced.

Further, when shifting from the power saving mode to the normal power mode, the system controller 101 turns on the relay 301 with the control signal S3 to activate the main power supply 320, and then sets the control signal S2 to Hi to turn on the second switch element 322. Consequently, the output from the main power supply 320 is supplied to the system controller 101. Then, the system controller 101 sets the control signal S1 to Low to turn off the first switch element 312, so that the supply of power from the power-saving power supply to the system controller 101 is stopped. Consequently, in the normal power mode an output Vcc2 from the main power supply is supplied to the system controller 101.

In a power supply configuration like that in FIG. 5, in which power is supplied by connecting the outputs from a plurality of power supplies, when one power supply among that plurality of power supplies is in an ON state and the other power supply is in an OFF state, current flows from the power supply in an ON state to the power supply in an OFF state. Therefore, the flow of current to the power supply in an OFF state is prevented by, as illustrated in FIG. 5, configuring so that diodes 317 and 327 are each connected in series with the outputs from the power supplies, and the cathodes of those diodes are connected to each other.

However, in a conventional circuit configuration in which power (power supply output) is supplied to a load via a diode, a loss of power due to a voltage drop at both terminals of the diode cannot be avoided.

Specifically, after the image forming apparatus has shifted from the power saving mode to the normal power mode, if the amount of power consumed by the system controller 101 increases, the voltage drop in the diode 327 increases. Consequently, the power supply voltage input to the system controller 101 can fall below the minimum voltage required to guarantee operation of the system controller 101. If the output voltage from the main power supply 320 is pre-set at a high level, the voltage drop at the diode 327 also decreases when the amount of current consumed by the system controller 101 is low. Consequently, the power supply voltage input to the system controller 101 can exceed the maximum voltage required to guarantee operation of the system controller 101.

Thus, the greater the fluctuation in the amount of current consumed by the system controller 101, the more difficult it is to satisfy the standards for both the minimum voltage and the maximum voltage required to guarantee operation of the system controller 101.

SUMMARY OF THE INVENTION

The present invention is directed to a power supply circuit that has a low power loss while preventing the flow of current from one power supply to another power supply.

According to an aspect of the present invention, a power supply circuit has a normal power mode and a power saving mode, which consumes less power than when in the normal power mode. The power supply circuit includes a first power supply configured to operate in the normal power mode, a second power supply, which has a lower power supply capability than the first power supply and is connected in parallel with the first power supply, configured to operate at least when in the power saving mode, a control unit to which an output from the first power supply and an output from the second power supply are supplied via a common connection point, and a switch element, which is connected between the first power supply and the connection point, configured to control power that is supplied to the control unit. A diode configured to prevent current flowing from the connection point toward the first power supply is connected in parallel with the switch element.

Further features of the present invention will become apparent from the following description of exemplary embodiments with reference to the attached drawings.

DESCRIPTION OF THE EMBODIMENTS

Figure 1:
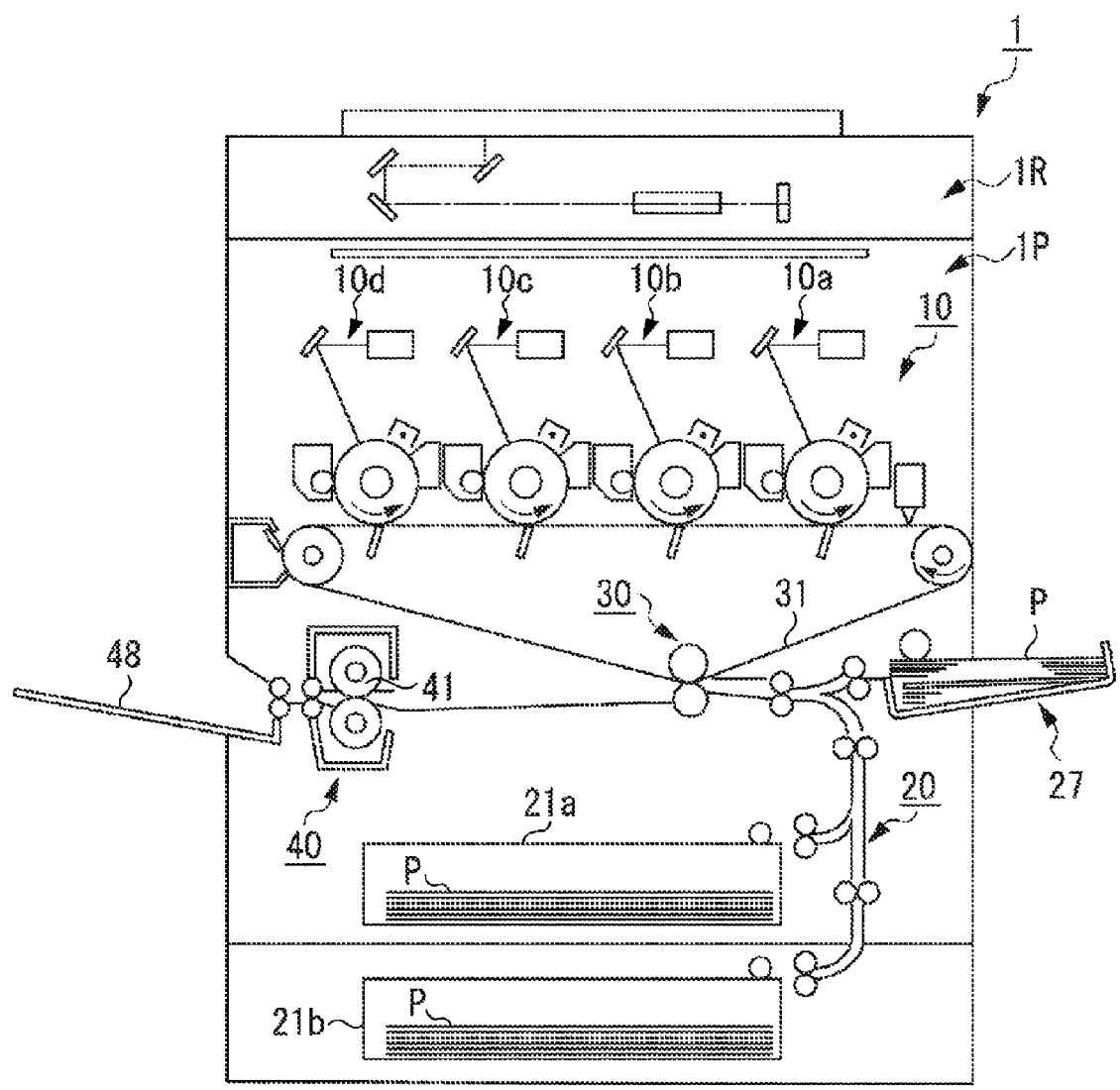
FIG. 1 is a cross-sectional view illustrating a configuration of an image forming apparatus.

FIG. 1 is a schematic cross-sectional view illustrating the overall configuration of an image forming apparatus according to an exemplary embodiment of the present invention. The image forming apparatus according to this exemplary embodiment is an electrophotographic color copying machine.

An image forming apparatus 1 includes an image reading unit 1R and an image output unit 1P. The image reading unit 1R optically reads a document image, converts the read image into an electric signal, and transmits the electric signal to the image output unit 1P. The image output unit 1P includes four image forming units 10 (10a, 10b, 10c, and 10d), a feeding unit 20 (21a, 21b, and 27), an intermediate transfer unit 30, a fixing unit 40, and a cleaning unit 50.

The four image forming units 10 respectively form yellow, magenta, cyan, and black toner images based on a known electrophotographic method. Each color toner image is superimposed and transferred onto an intermediate transfer body 31. A sheet P is fed from the feeding unit 20, and the toner image on the intermediate transfer body 31 is transferred onto the sheet P by the transfer unit 30. The toner image transferred onto the sheet P is fixed by the fixing unit 40, and the sheet P is then discharged onto a discharge tray 48.

Figure 2:
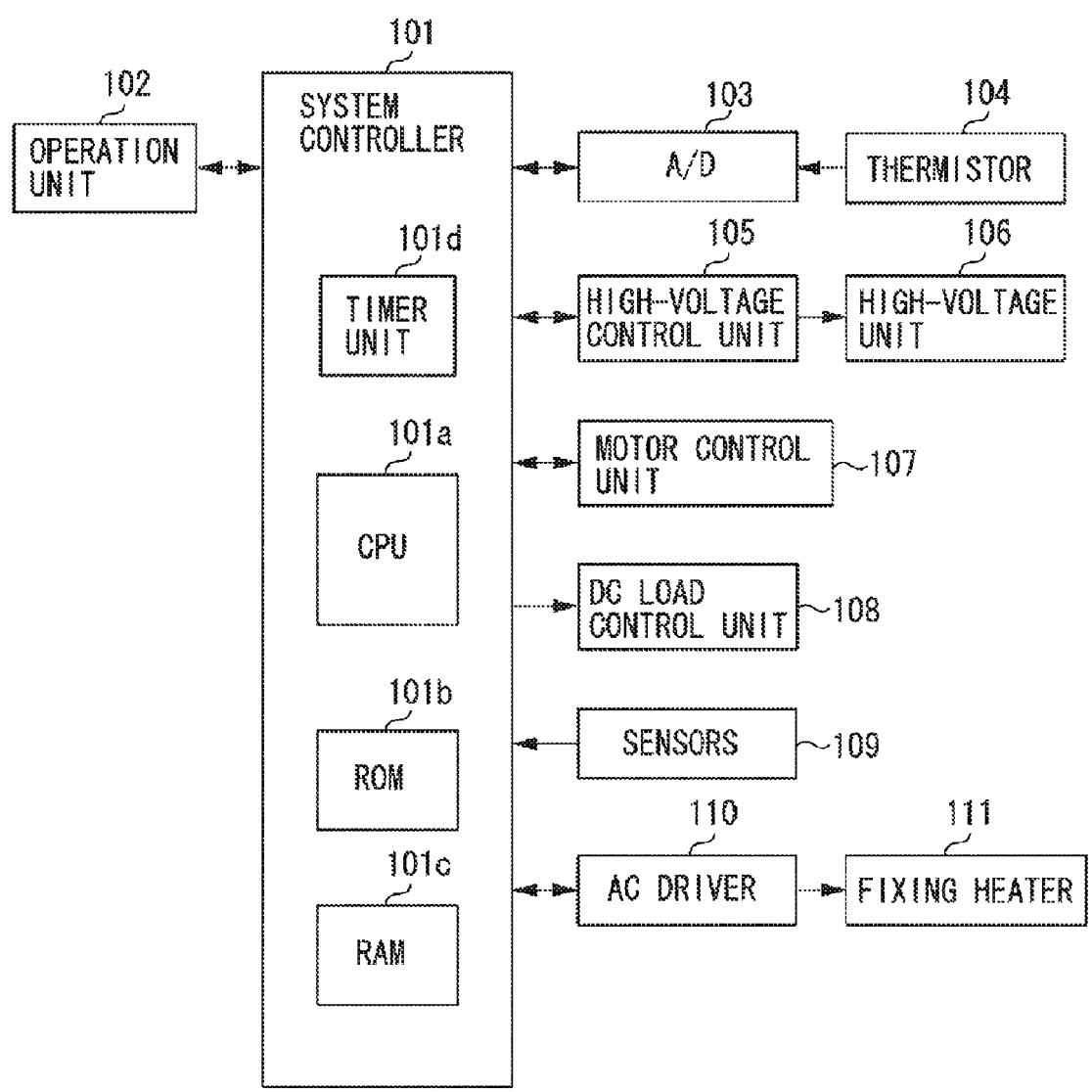
FIG. 2 is a block diagram illustrating a control system of the image forming apparatus.

Next, the control system of the image forming apparatus 1 will be described with reference to FIG. 2. The image forming apparatus 1 is controlled in an integrated manner by a central processing unit (CPU) 101a in a system controller 101. The CPU 101a mainly collects and analyzes information about the drive of the various loads in the main apparatus and information from sensors. Further, the CPU 101a also performs the role of converting data from an operation unit 102, namely, a user interface. The CPU 101a is connected to a read-only memory (ROM) 101b, a random-access memory (RAM) 101c, and a timer unit 101d.

A program is stored in the ROM 101b. The CPU 101a executes various sequences relating to an image forming process based on the program. The RAM 101c stores rewritable data that needs to be temporarily or permanently stored during that time. Further, the RAM 101c stores, for example, a high voltage setting value in a below-described high voltage control unit 105, various kinds of data that are described below, and image formation instruction information from the operation unit 102. The timer unit 101d includes a plurality of timers for measuring an interval between below-described patterns for registration correction and performing a count for image writing timing.

The image forming apparatus 1 further includes direct current (DC) loads, such as motors and a clutches/solenoids, which are operated by a direct current, and sensors, such as photo interrupters and micro power switches, in various locations in the apparatus. Namely, the system controller 101 conveys the transfer material and drives the various units by driving the motors and appropriately driving each DC load. Sensors 109 monitor this operation.

The system controller 101 smoothly proceeds the image formation operation by controlling each motor with a motor control unit 107 based on a signal from the sensors 109, and activating the clutches/solenoids with a DC load control unit 108. Further, the system controller 101 applies a suitable high voltage to the respective charging devices, which are included in a high voltage unit 106, by transmitting various high voltage control signals to the high voltage control unit 105. A heater 111 for heating a fixing roller 41 is provided in the fixing unit 40. The heater 111 is turned on/off by an alternating current (AC) driver 110. Further, a thermistor 104 for measuring the temperature of the fixing roller 41 is provided on the surface of the fixing roller 41. An output from the thermistor 104 is converted into a digital signal by an analog-digital (A/D) convertor 103. The converted signal is input to the system controller 101 as a digital value. The system controller 101 controls the AC driver 110 by detecting the temperature of the fixing roller 41 based on this digital value.

Further, a hard disk 112 is connected to the system controller 101. The hard disk 112 stores image data transmitted from the image reading unit 1R. The system controller 101 performs print processing by reading data stored in the hard disk 112 based on an operation from the operation unit 102.

The operation unit 102 is used by a user to set information, such as copying magnification and a density setting value. Further, the operation unit 102 also transmits data for showing the user the number of image formation sheets, whether image formation is currently being performed, and if and where a jam has occurred.

Figure 3:
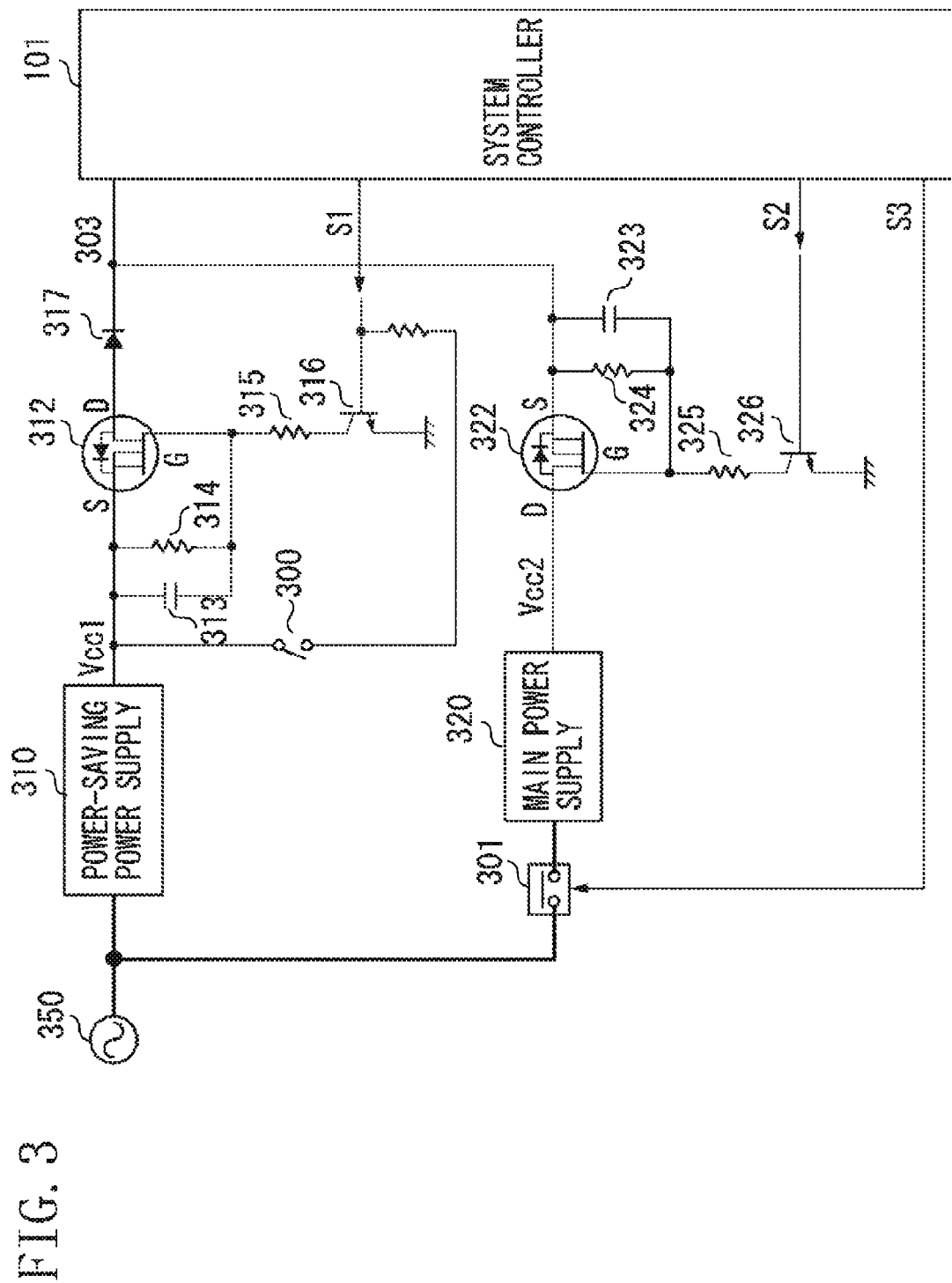
FIG. 3 illustrates a configuration of a power supply circuit.

FIG. 3 illustrates a configuration of the power supply circuit in the image forming apparatus according to the present exemplary embodiment.

The power supply circuit is mainly configured from a main switch 300, a power-saving power supply 310, a main power supply 320, the system controller 101, a relay 301, a first switch element 312, and a second switch element 322. Resistors 314 and 315 and resistors 324 and 325 work to apply necessary bias voltage for operation of the first switch element 312 and the second switch element 322 on the gates and sources. Capacitors 313 and 323 work to determine the timing of the on and off operations of the first switch element 312 and the second switch element 322. Further, transistors 316 and 326 work to turn on or turn off the first switch element 312 and the second switch element 322 by changing the bias voltage of the first switch element 312 and the second switch element 322. The main switch 300 has a function of switching power supply for manually turning on or off the image forming apparatus 1. The number and type of these parts is not especially limited to this circuit configuration, and may be appropriately selected and arranged to match the apparatus.

As described above, the system controller 101 performs various types of control on the image forming apparatus 1, and controls the switching of the power supply based on the mode of the image forming apparatus 1. The relay 301 connects or cuts the power supply path from a commercial alternating current power supply 350 until the main power supply 320 as a first power supply. The first switch element 312 switches whether to supply the output from the power-saving power supply 310 as a second power supply to the system controller 101. The second switch element 322 switches whether to supply the output from the main power supply 320 to the system controller 101. The output from the main power supply 320 and the output from the power-saving power supply 310 are connected at a common connection point 303, and are supplied to the system controller 101.

Power supply capability of the main power supply 320 is about 200 W. Further, power supply capability of the power-saving power supply 310, which has a smaller power supply capability than the main power supply 320, is about 1 W. The main power supply 320 and the power-saving power supply 310 may be configured as independent units, or configured as an integral unit. However, the AC input unit of the main power supply 320 needs to be provided with one or more of some kind of cutoff unit like the relay 301 with regard to the common AC input unit with the power-saving power supply 310.

When the image forming apparatus 1 is in the power saving mode, power is supplied to the system controller 101 from the power-saving power supply 310. When the image forming apparatus 1 is in the normal operation mode, power is supplied to the system controller 101 from the main power supply 320.

Operation of the power supply circuit will now be described. When in the power saving mode, the system controller 101 sets a control signal S1 to a Hi state, so that the first switch element 312 is in an ON state. At this stage, the system controller 101 shuts the relay 301 with a control signal S3, so that the main power supply 320 is in an OFF state. Further, the system controller 101 sets a control signal S2 to a low state, so that the second switch element 322 is also off. Thus, during the power saving mode, the power consumption of the overall apparatus is decreased by supplying an output Vcc1 from the power-saving power supply 310 to the system controller 101, and turning the other power supply off.

When the image forming apparatus shifts from the power saving mode to the normal power mode, the system controller 101 turns on the relay 301 with the control signal S3 to start the main power supply 320. Then, the system controller 101 sets the control signal S2 to Hi to turn on the second switch element 322, so that power is supplied from the main power supply 320 to the system controller 101. The system controller 101 then sets the control signal S1 to low to turn off the first switch element 312, so that the supply of power from the power-saving power supply 310 to the system controller 101 is stopped. An operation timing is set so that the various processing operations performed by the system controller 101 start after the power supply source to the system controller 101 has switched to the main power supply 320. Consequently, power is stably supplied even during the shift from the power saving mode to the normal power mode, and an output Vcc2 from the main power supply 320 continues to be supplied to the system controller 101 in the normal power mode.

When the image forming apparatus shifts from the normal power mode to the power saving mode, the system controller 101 finishes its various processing operations. Then, after the power consumption of the system controller 101 has decreased to a level at which power can be supplied by the power-saving power supply 310, the system controller 101 sets the control signal S1 to Hi to turn on the first switch element 312. This enables power to be supplied from the power-saving power supply 310 to the system controller 101. The system controller 101 then sets the control signal S2 to low to turn off the second switch element 322. Further, simultaneously with or a little bit after setting the control signal S2 to low, the system controller 101 turns off the relay 301 via the control signal S3, so that the supply of power from the main power supply 320 to the system controller 101 is stopped. Consequently, power is stably supplied even during the shift from the normal power mode to the power saving mode, and the output Vcc1 from the power-saving power supply 310 continues to be supplied to the system controller 101 during the power saving mode in the manner described above.

Figure 5:
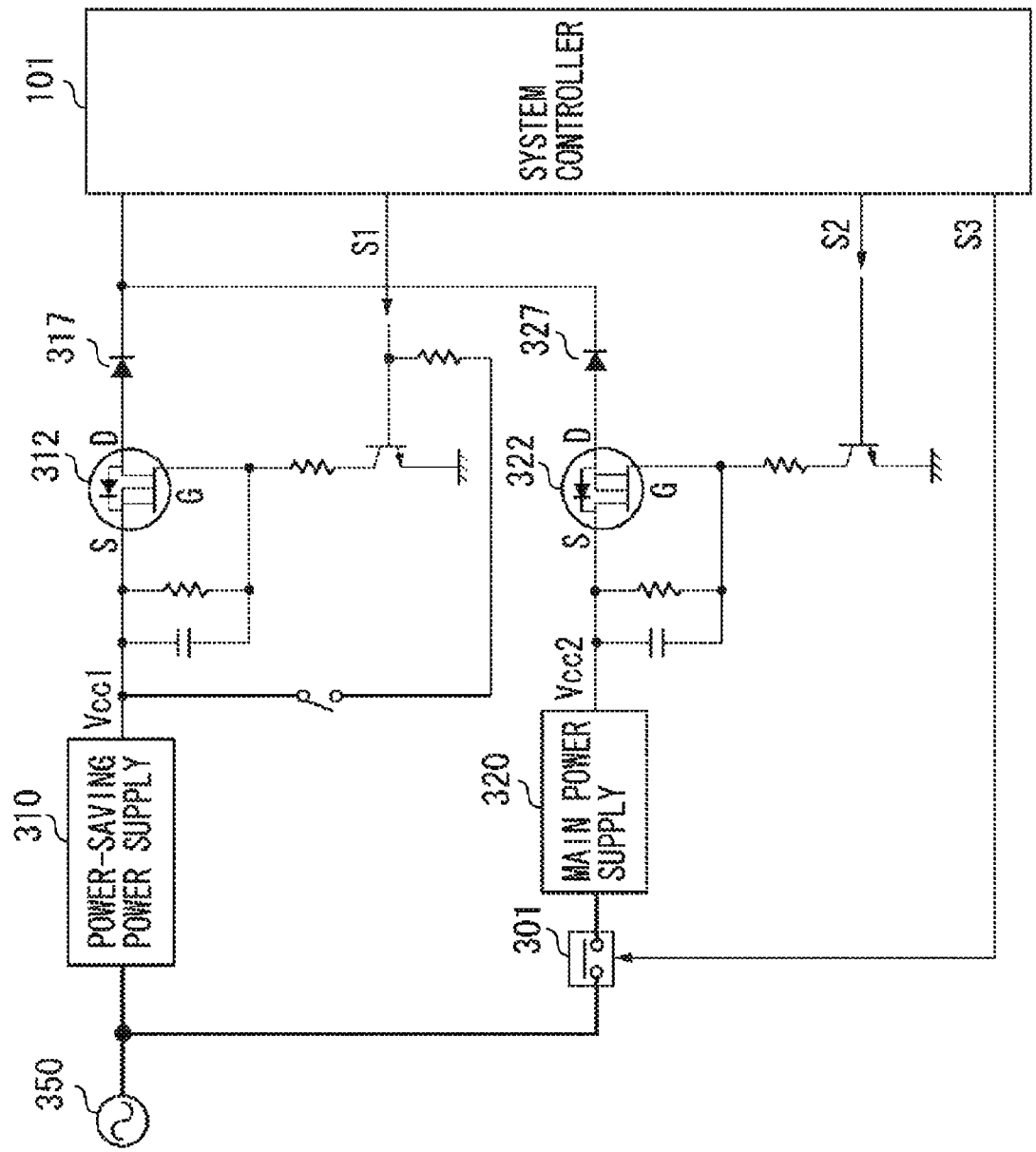
FIG. 5 illustrates a configuration of a conventional power supply circuit.

If a plurality of power supply outputs are connected and power is supplied from one of those power supplies, a circuit needs to be provided that prevents current flowing from the power supply that is on to the power supplies that are off. For example, in the circuit illustrated in FIG. 3, a p-channel type field-effect transistor is used as the first switch element 312 and the second switch element 322. This field-effect transistor includes a path along which current flows from the drain terminal to the source terminal through a body diode arranged in parallel with the channel when the field-effect transistor is in an OFF state. Namely, when the power-saving power supply 310 is on and the main power supply 320 is off, current flows to the main power supply 320 via a body diode of the field-effect transistor, which is the second switch element 322, even if the second switch element 322 has been turned off. Therefore, as illustrated in FIG. 5, in a conventional configuration, current is prevented from flowing to the power supply side by connecting the diodes 317 and 327, respectively, in series from the power-saving power supply 310 and the main power supply 320 toward the load side.

Here, in the power saving mode, the amount of current consumed by the system controller 101 and the amount of fluctuation in current consumption are both small. Therefore, the voltage drop caused by the diode 317 and the amount of fluctuation in the current decrease are also both small.

However, in the normal power mode, the amount of current consumed by the system controller 101 and the amount of fluctuation in current consumption are both larger. Therefore, the voltage drop caused by the diode 327 and the amount of fluctuation in the current consumption also increase, so that the voltage supplied from the main power supply 320 to the system controller 101 may not satisfy the input voltage range required by the system controller 101.

Accordingly, in the present exemplary embodiment, the connection state of the second switch element 322 connected to the main power supply 320 and the connection state of the first switch element 312 connected to the power-saving power supply 310 are reversed. Namely, the drain terminal of the second switch element 322 is connected to the main power supply side, and the source terminal is connected to the connection point 303 side (load side). Further, the source terminal of the first switch element 312 that is connected to the power-saving power supply 310 is connected to the power-saving power supply 310 side, and the drain terminal is connected to the connection point 303 side (load side).

This enables the diode 327 (FIG. 5), which is conventionally provided in series, to be omitted, because the body diode (second diode) that is in parallel with the channel of the field-effect transistor is in a direction along which current does not flow to the main power supply 320.

Consequently, because there is no voltage drop like there is in a conventional diode, the input voltage required for the system controller 101 can be satisfied even if the current consumption of the system controller 101 substantially increases during the normal power mode.

Further, in the power saving mode, namely, when the second switch element 322 is in an OFF state, a bias voltage is applied between the source terminal and the gate terminal of the second switch element 322 from the power-saving power supply 310, which is already under operation, via the source terminal and the drain terminal of the first switch element 312 and the diode 317.

In addition, in the normal power mode, namely, when the main power supply 320 has been started and the second switch element 322 is in an ON state, a bias voltage is applied between the source terminal and the gate terminal of the second switch element 322 from the main power supply 320 via the drain terminal and the source terminal of the second switch element 322. Therefore, the second switch element 322 can stably operate in either power mode.

To prevent current flowing from the main power supply 320 to the power-saving power supply 310 via the body diode that is included in the first switch element 312, the diode 317 is connected in series to the first switch element 312 as in the conventional manner. Further, as described above, since the amount of current consumed by the system controller 101 and the amount of fluctuation in current consumption are both small in the power saving mode, the voltage drop caused by this diode 317 is not a problem. Although the diode 317 is arranged downstream from the first switch element 312, the diode 317 may also be arranged upstream from the first switch element 312.

Figure 7:
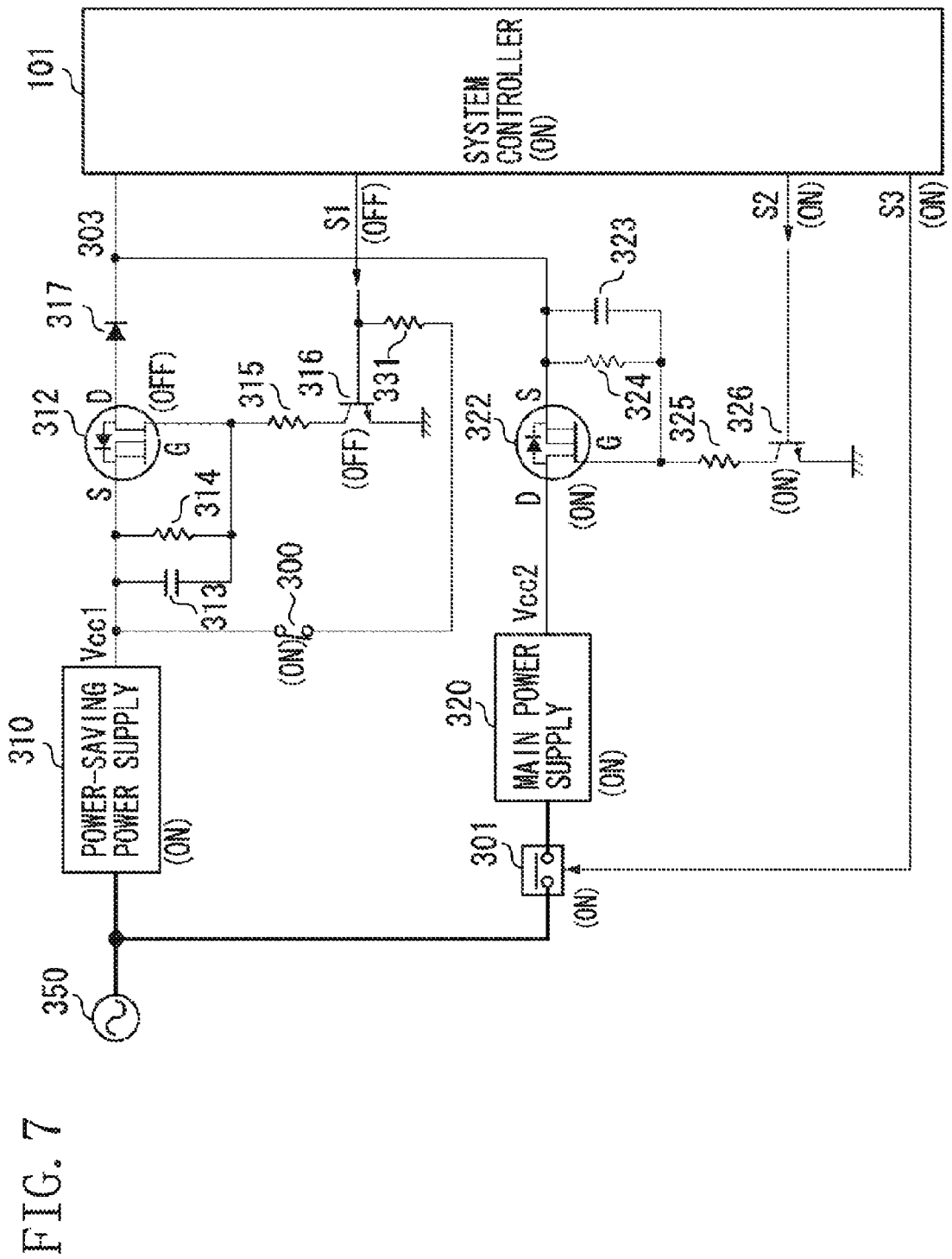
FIG. 7 illustrates a state of the power supply circuit during a normal power mode.
Figure 8:
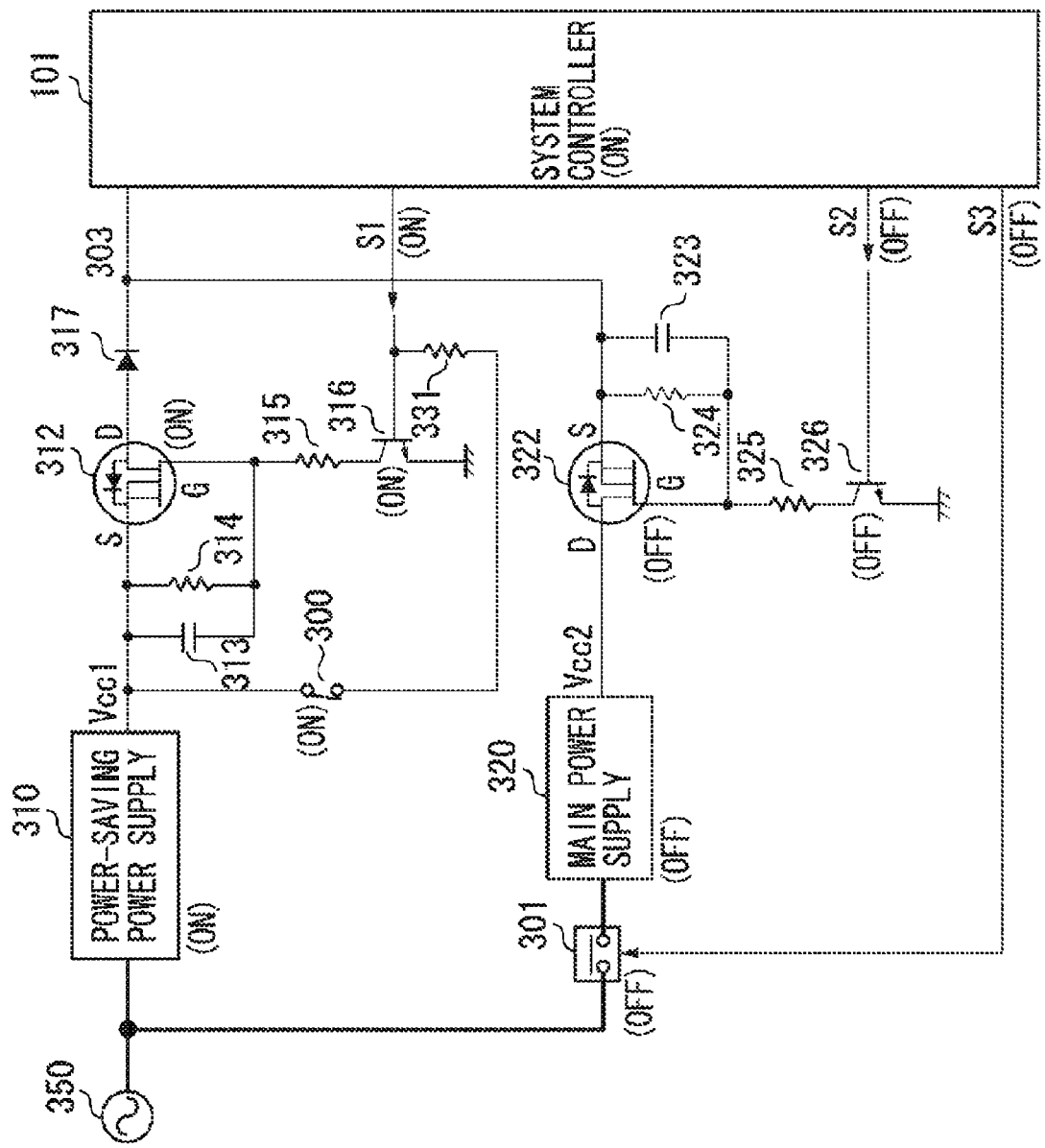
FIG. 8 illustrates a state of the power supply circuit during a power saving mode.

A case in which it is necessary to reduce power even further by cutting the supply of power to the system controller 101 will now be described with reference to FIGS. 6, 7, and 8.

Figure 6:
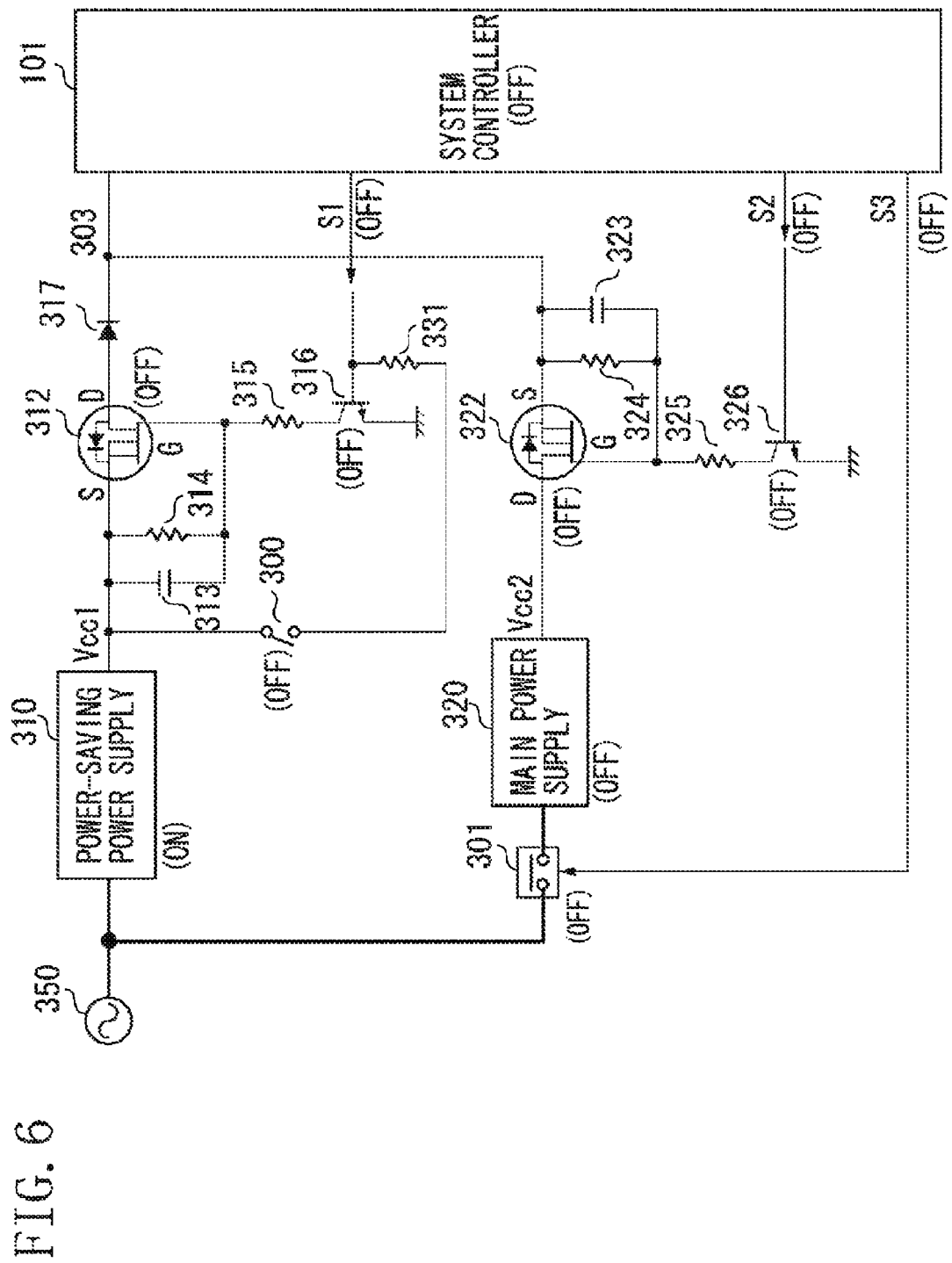
FIG. 6 illustrates a state of a power supply circuit when the power is off.

FIG. 6 illustrates the state of each signal and each load when the image forming apparatus 1 is in a power-off mode.

In a power-off mode, the supply of power to the system controller 101 has been cut. Consequently, the system controller 101 cannot output any of control signals S1, S2, or S3. Further, the first switch element 312, the second switch element 322, and the relay 301 cannot be turned on. Therefore, the only way to return the image forming apparatus from the power-off mode is for the user to manually turn on the main switch 300.

Next, the state of each signal and of each load when the image forming apparatus 1 is in the normal power mode will be described with reference to FIG. 7. When the main switch 300 is turned on, the output Vcc1 from the power-saving power supply 310 is applied on the ba e terminal of the transistor 316 via the main switch 300, and the transistor 316 is turned on. Consequently, the first switch element 312 is turned on, and the output Vcc1 from the power-saving power supply 310 is also supplied to the system controller 101.

When the system controller 101 starts, the system controller 101 sets the control signal S1 to ON (Hi state). Consequently, the first switch element 312 remains on regardless of the state of the main switch 300. Next, the system controller 101 sets the control signal S3 to ON (Hi state) to turn on the relay 301, so that the main power supply 320 is turned on. Then, the system controller 101 sets the control signal S2 to ON (Hi state) to turn on the second switch element 322. Consequently, power from the main power supply 320 is supplied to the system controller 101. Then, the system controller 101 sets the control signal S1 to OFF (Low state) to turn off the first switch element 312, so that the supply of power from the power-saving power supply 310 to the system controller 101 is stopped. Consequently, the output Vcc2 from the main power supply 320 continues to be supplied to the system controller 101 in the normal power mode.

The state of each signal and of each load when the image forming apparatus 1 is in the power saving mode will be described with reference to FIG. 8. Since the sequence for shifting from the normal power mode to the power saving mode is similar to the sequence described above, a description thereof will be omitted here. In the power saving mode, the system controller 101 sets the control signal S1 to ON (Hi state) to turn on the first switch element 312. Further, the system controller 101 sets the control signals S2 and S3 to OFF (Low state) to turn off the relay 301, the main power supply 320, and the second switch element 322. Consequently, the output Vcc1 from the power-saving power supply 310 continues to be supplied to the system controller 101 in the power saving mode.

In the power saving mode and the normal power mode, when the system controller 101 detects that the main switch 300 has been turned off, the system controller 101 finishes the various processing operations, and then sets the control signals S1, S2, and S3 to OFF (Low state) to shift to a power off state.

Figure 4:
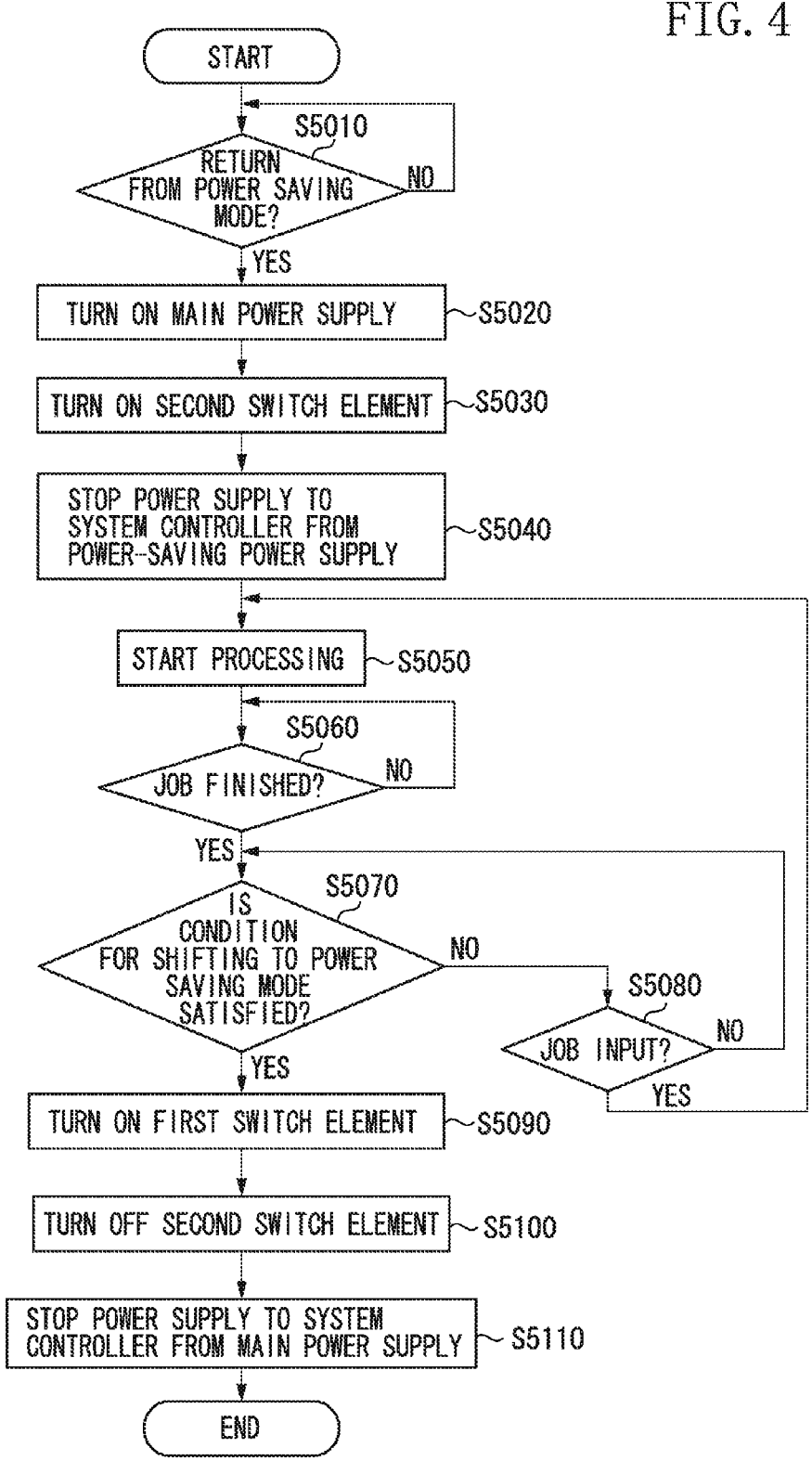
FIG. 4 illustrates a control flowchart.

FIG. 4 illustrates a flowchart of power control in the image forming apparatus 1. The below-described processing is controlled in an integrated manner by the CPU 101a, which is included in the system controller 101.

When the power mode is the power saving mode, in step S5010, the CPU 101a determines whether a return request from the power saving mode has been made, namely, whether a print job, a scan job or the like has been input from the operation unit 102. As described above, in the power saving mode, the first switch element 312 has been turned on by the control signal S1, and the output Vcc1 from the power-saving power supply 310 is being supplied to the system controller 101. Further, the relay 301 has been cut by the control signal S3, the main power supply is in an OFF state, and the second switch element 322 has also been turned off by the control signal S2.

If the CPU 101a determines that a job has been input so that there is a need to return to the normal power mode from the power saving mode (YES in step S5010), in step S5020, the CPU 101a turns on the main power supply 320 with the control signal S3.

In step S5030, after the main power supply 320 has been turned on and the output has become stable, the CPU 101a turns on the second switch element 322 with the control signal S2, and power is output from the main power supply 320.

Then, in step S5040, the CPU 101a turns off the first switch element 312 with the control signal S1, and stops the supply of power from the power-saving power supply 310 to the system controller 101.

Next, in step S5050, the CPU 101a starts various processing operations for the input job at a timing after the power supply source to the system controller 101 has switched to the main power supply 320.

In step S5060, the CPU 101a determines whether the input job has finished. If the CPU 101a determines that the input job has finished (YES in step S5060), in step S5070, the CPU 101a determines whether a condition for shifting to the power saving mode is satisfied. Examples of the condition for shifting to the power saving mode may include a job not being input for a predetermined duration after the finish of a job, no operations being performed on the operation unit 102 of the image forming apparatus 1, and an instruction from the operation unit 102 to shift to the power saving mode. Further, the predetermined duration may be set to a time desired by the user from the operation unit 102.

If the CPU 101a determines that the condition for shifting to the power saving mode is not satisfied (NO in step S5070), in step S5080, the CPU 101a determines whether a job has been newly input. If the CPU 101a determines that a job has been input (YES in step S5080), the processing returns to step S5050, and the CPU 101a performs the processing for that job. If the CPU 101a determines that a job has not been input (NO in step S5080), the processing returns to step S5070.

If the CPU 101a determines that the condition for shifting to the power saving mode is satisfied (YES in step S5070), in step S5090, the CPU 101a finishes the various processing operations for shifting to the power saving mode, and turns on the first switch element 312 with the control signal S1 so that power can be supplied to the system controller 101 from the power-saving power supply 310.

Then, in step S5100, the CPU 101a turns off the second switch element 322 with the control signal S2. In step S5110, the CPU 101a also turns off the relay 301 with the control signal S3, so that the supply of power from the main power supply 320 to the system controller 101 is stopped.

Thus, according to an exemplary embodiment of the present invention, the loss of power supplied from the main power supply 320 to the system controller 101 during normal power mode can be prevented as much as possible, so that the power voltage required for operation can be maintained even if the system controller 101 consumes a large amount of current.

In the circuit illustrated in FIG. 3, similar to the second switch element 322, the first switch element 312 may be configured without having the diode 317, by arranging so that the drain terminal is on the power-saving power supply 310 side and the source terminal is on the connection point 303 side. However, in such a configuration, power is constantly supplied to the system controller 101 via an internal diode in the field effect transistor (FET), even if the image forming apparatus 1 shifts to the power saving mode. To eliminate such wasteful power consumption, in the present exemplary embodiment, the circuit is configured as illustrated in FIG. 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-263256 filed Nov. 30, 2012, and Japanese Patent Application No. 2013-224605, filed Oct. 29, 2013, which are hereby incorporated by reference herein in their entirety.

What is claimed is:

1. A power supply circuit for an apparatus that operates in a normal power mode and in a power saving mode, in which power consumption is less than in the normal power mode, the power supply circuit comprising:
a power supply switch configured to be operated so as to turn ON/OFF a power supply of the apparatus;
a first power supply configured to supply power to the apparatus when the apparatus operates in the normal power mode;
a second power supply, which has a lower power supply capability than the first power supply and is connected in parallel with the first power supply, configured to supply power to the apparatus at least when the apparatus operates in the power saving mode, wherein the second power supply is in an ON-state even when the power supply switch is operated to OFF and the apparatus is in a power-off mode;
a controller to which power from the first power supply and power from the second power supply are supplied via a common connection point;
a first switch element, which is connected between an output terminal of the first power supply and the connection point, configured to control power that is supplied to the controller,
a second switch element, which is connected between an output terminal of the second power supply and the connection point, configured to control power that is supplied to the controller; and
a diode, which is connected between the second power supply and the connection point in series with the second switching element and prevents a current from flowing from the first power supply to the second power supply via the connection point during the normal power mode and the power saving mode,
wherein the first switch element is a first field-effect transistor, and includes a first internal diode between a source terminal of the first field-effect transistor and a drain terminal of the first field-effect transistor, and the drain terminal of the first field-effect transistor is connected to the first power supply side and the source terminal of the first field-effect transistor is connected to the connection point side to prevent current flowing from the connection point toward the first power supply, and
wherein the second switch element is a second field-effect transistor, and includes a second internal diode between a source terminal of the second field-effect transistor and a drain terminal of the second field-effect transistor, and the source terminal of the second field-effect transistor is connected to the second power supply side and the drain terminal of the second field-effect transistor is connected to the connection point side to prevent a current from flowing from the second power supply toward the connection point when the apparatus is in the power-off mode.

2. The power supply circuit according to claim 1, wherein the first switch element and the second switch element are a p-channel type field-effect transistor.

3. The power supply circuit according to claim 1, wherein the first switch element is controlled by a first signal from the controller and the second switch element is controlled by a second signal from the controller.

4. The power supply circuit according to claim 1, further comprising:
a cutoff unit configured to cut an alternating voltage that is supplied to the first power supply,
wherein the controller is configured to cause the cutoff unit to cut the alternating voltage that is supplied to the first power supply when the apparatus operates in the power saving mode.

5. The power supply circuit according to claim 1, wherein the controller is configured to stop supply of power from the second power supply to the controller when the apparatus operates in the normal power mode.

* * * * *